United States Patent [19]

Holton

[11] 4,259,767

[45] Apr. 7, 1981

[54] FASTENER

[75] Inventor: Robert J. Holton, North Caldwell, N.J.

[73] Assignee: Eaton Corporation, Cleveland, Ohio

[21] Appl. No.: 55,740

[22] Filed: Jul. 9, 1979

[51] Int. Cl.³ .............................................. F16B 2/20
[52] U.S. Cl. ................... 24/73 SM; 24/73 B; 24/73 SA; 24/73 MF; 24/81 B
[58] Field of Search ............. 24/73 SM, 73 B, 73 SA, 24/73 MS, 73 MF, 73 R, 81 B

[56] References Cited

U.S. PATENT DOCUMENTS

| 2,295,444 | 9/1942 | Woodward | 24/81 B |
|---|---|---|---|
| 2,607,971 | 8/1952 | Bedford, Jr. | 24/73 B |
| 2,685,721 | 8/1954 | Eves | 24/73 SA |
| 2,780,850 | 2/1957 | Lieff | 24/73 SM |
| 2,940,145 | 6/1960 | Fernberg | 24/81 B |
| 3,122,604 | 2/1964 | Cook et al. | 24/81 B |
| 3,444,596 | 5/1969 | Soltysik | 24/73 SA |
| 3,617,980 | 11/1971 | Alkire et al. | 24/73 B |
| 3,673,643 | 7/1972 | Kindell | 24/73 B |
| 3,869,760 | 3/1975 | Meyer | 24/73 B |

FOREIGN PATENT DOCUMENTS

| 1250688 | 9/1967 | Fed. Rep. of Germany | 24/73 B |
|---|---|---|---|
| 885396 | 12/1961 | United Kingdom | 24/73 B |

*Primary Examiner*—Victor N. Sakran
*Attorney, Agent, or Firm*—R. J. McCloskey; H. D. Gordon

[57] ABSTRACT

A one-piece, spring steel fastener (10) for releasably retaining the edge of a plastic panel (P) with a predetermined resistance to release is provided. The fastener comprises a base section (12) and a pair of leg sections (14, 16) extending therefrom. The leg sections each comprise a first portion (22, 24) extending upwardly and inwardly from the base section and a second portion (34, 36) extending downwardly and inwardly from the first portion to a free edge (38, 40). A tab (46, 48) is sheared from the second leg portions and extends generally inwardly therefrom. The free edges are separated by a distance (42) generally equal to the thickness (44) of the panel while the innermost edges of the tabs are separated by a distance (50) less than the thickness of the panel.

4 Claims, 6 Drawing Figures

FASTENER

BACKGROUND OF THE INVENTION

1. Field of the Invention

The present invention relates to one-piece, spring steel, stamped fasteners for releasably retaining the edges of panels, such as plastic panels or the like, and more particularly relates to one-piece, spring steel, stamped fasteners for releasably gripping and retaining the edge of a plastic panel with a preselected resistance to release of a retained panel edge.

2. Description of the Prior Art

One-piece, stamped sheet metal fasteners for releasably retaining panel edges are known in the prior art. The prior art fasteners for retaining the edges of plastic panels have typically utilized the free edges of opposed leg portions or tabs to resiliently retain a panel edge therebetween. The free ends of the opposed leg portions or tabs were typically inclined in a converging direction and/or in a direction opposite the direction of removal of a resiliently retained panel for grippingly engaging and/or penetrating the sides of the panel and for resisting removal thereof. While the prior art fasteners were suitable for many purposes, the prior art fasteners were not totally satisfactory for conditions wherein removal of a retained panel upon the application of a predetermined removal force was required. Generally, the prior art fasteners were not suitable for this purpose as the free edges of the opposed legs or tabs thereof tended to penetrate and/or cause cold formed depressions into the plastic panels under the resilient gripping force of the fasteners and such penetration and/or cold formed depressions were often of a very unpredictable and often excessive depth. Other prior art fasteners were unsatisfactory as they tended to be complicated and/or expensive to manufacture and/or use.

SUMMARY OF THE INVENTION

In accordance with the present invention, the drawbacks of the prior art have been overcome to the extent that a relatively simple, inexpensively produced fastener is provided for releasably retaining the edge of plastic panels with a predetermined resistance to release of retained panels.

The above is accomplished by providing a stamped, one-piece, spring steel fastener comprising a base section having a pair of leg sections extending from opposite edges thereof. The base section may include means to mount the fastener to a support member allowing the fastener to be utilized to removably retain a plastic panel to a support member. Each of the leg sections comprises a first portion extending upwardly and preferably inwardly from the base section and a second portion extending downwardly and inwardly from the first portion. The free edges of the second leg portions are separated by a distance generally equal to or slightly less than the thickness of the panel to be retained by the fastener. At least one tab is cut out from each of the free edges of the second leg portions and extends inwardly therefrom. The innermost edges of the tab portions on the two leg portions are separated by a distance less than the separation of the free edges of the second leg portions. The total length of the free edges of said second leg portions is considerably greater than the total length of the innermost edges of the tab portions to prevent, or tend to prevent, the free edges of the leg portions from forming cold formed depressions in the sides of retained plastic panels. The tabs will engage the side surfaces of a received plastic panel and, under the resilient force of the leg portions, tend to cause cold formed depressions in the sides of the plastic panels for retention of the plastic panels in the fastener. The depth of the cold formed depressions will correspond generally to the inward extension of the tabs measured from innermost edges thereof to the free edges of the second leg portions. When removal of a retained plastic panel from the fastener of the present invention is required, and initial removal force is applied to the panel sufficient to cause the leg sections to resiliently deform as the free edges thereof pivot on the side surfaces of the panel until the tabs rotate out of the cold formed depressions, then a lesser removal force is required to simply overcome resilient frictional forces as the panel is removed from the fastener. The magnitude of the initial removal force will, of course, be dependent on the inward extension of the tabs and corresponding depth of cold formed depressions formed thereby. The magnitude of the required initial removal force may thus be of a predetermined value or within a predetermined range of values.

Accordingly, it is an object of the present invention to provide a new and improved one-piece, stamped spring steel fastener for removably retaining the edges of plastic panels with a predetermined resistance to removal of retained panels.

This and other objects and advantages of the present invention will become apparent from a reading of the detailed description of the preferred embodiment taken in connection with the attached drawings.

BRIEF OF THE DRAWINGS

DESCRIPTION OF THE PREFERRED EMBODIMENT

Figure 1:
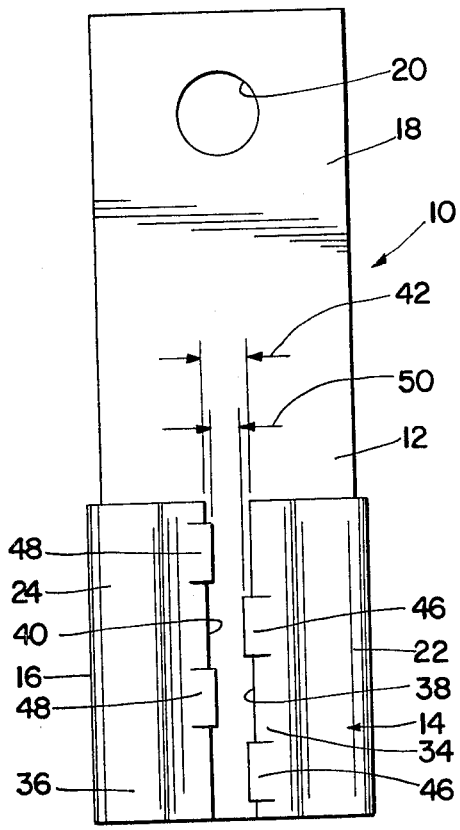
FIG. 1 is a top view of the fastener of the present invention.
Figure 2:
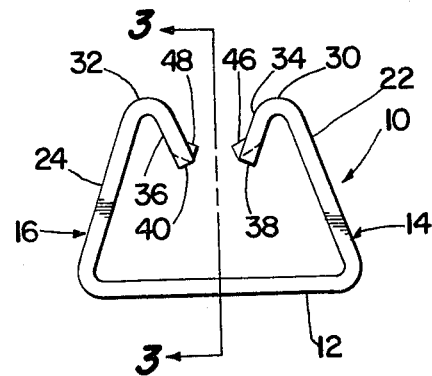
FIG. 2 is a front view of the fastener of the present invention.
Figure 3:
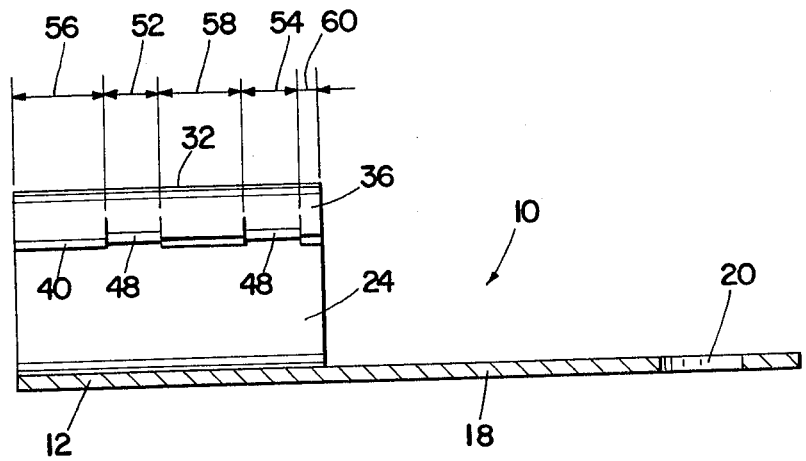
FIG. 3 is a cross sectional side view of the fastener of the present invention taken along the line 3–3 in FIG. 2.

Certain terminology will be used in the following description for convenience in reference only and will not be limiting. The words "upwardly" and "downwardly" will designate directions in the drawings to which reference is made. The words "inwardly" and "outwardly" will refer to directions toward and away from, respectively, the geometric center of the fastener. Said terminology will include the words above specifically mentioned, derivatives thereof and words of similar import.

The fastener 10 of the present invention comprises a base section 12 and two leg sections 14 and 16 cantilevered from opposite edges of the base section. The base section 12 may include means to mount the fastener 10 to a support member (not shown) such as extension 18 having an aperature 20 therethrough for receipt of a threaded member, rivet or the like. Other known means for mounting the fastener 10 to a support member may be utilized.

Each of the leg sections, 14 and 16, comprise a first leg portion 22 or 24, cantilevered from a first edge 26 or 28, respectively, attached to the base portion and extending upwardly and inwardly to a second edge 30 or 32, respectively. Each of the leg sections also comprises a second leg portion 34 or 36, respectively, cantilevered from one of the second edges, 30 or 32, respectively, of the first leg portions, 22 or 24, respectively, and extending inwardly and downwardly to a free edge, 38 or 40, respectively. The free edges 38 and 40 of the second leg portions 34 and 36 are separated by a distance 42, in the nonresiliently deformed position of clip 10, which is equal to, or generally less than the thickness 44 of the panel P to be releasably retained by clip 10.

At least one tab member, 46 and 48, is sheared out of the free ends, 38 and 40, respectively, and extends generally inwardly from said free ends. The innermost edges of the tabs, 46 and 48, are separated by a distance 50, in the nondeformed position of clip 10, which is less than the distance 42 between the free edges of the second leg portions.

For either leg portion, 14 or 16, the total axial length, 52 and 54 of the innermost edges of the tabs is less than the total axial length 56, 58 and 60 of the free edges of the second leg portions. Preferably, the total axial length of the tabs is less than one-half the total axial length of the free ends of the leg portions. The innermost edges of the tab extend inwardly from the free edges 36 and 38, respectively, of the second leg portions by a distance 62 which is measured generally perpendicular to the side surface of the edge portion of the plastic panel P to be releasably retained by fastener 10.

Figure 4:
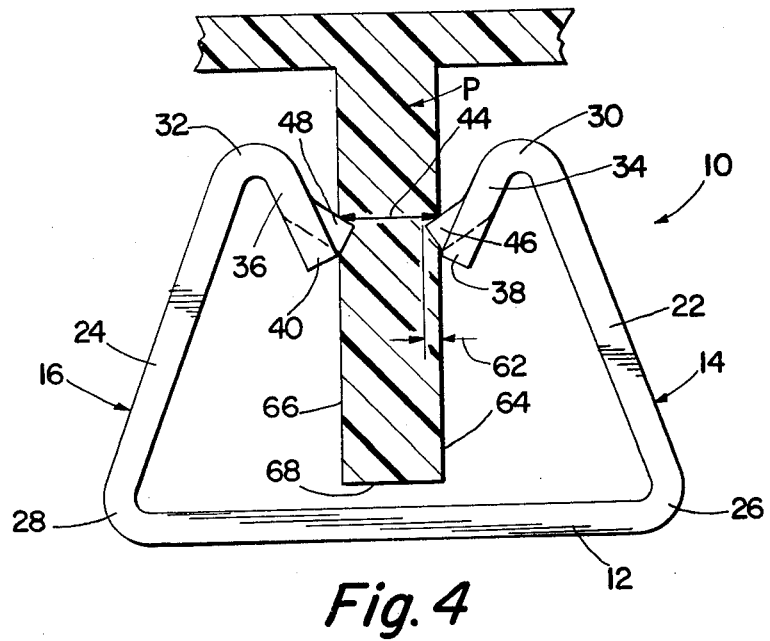
FIG. 4 is an enlarged sectional view of the fastener of the present invention, partially in section, showing the fastener removably retaining the edge of a plastic panel.
Figure 5:
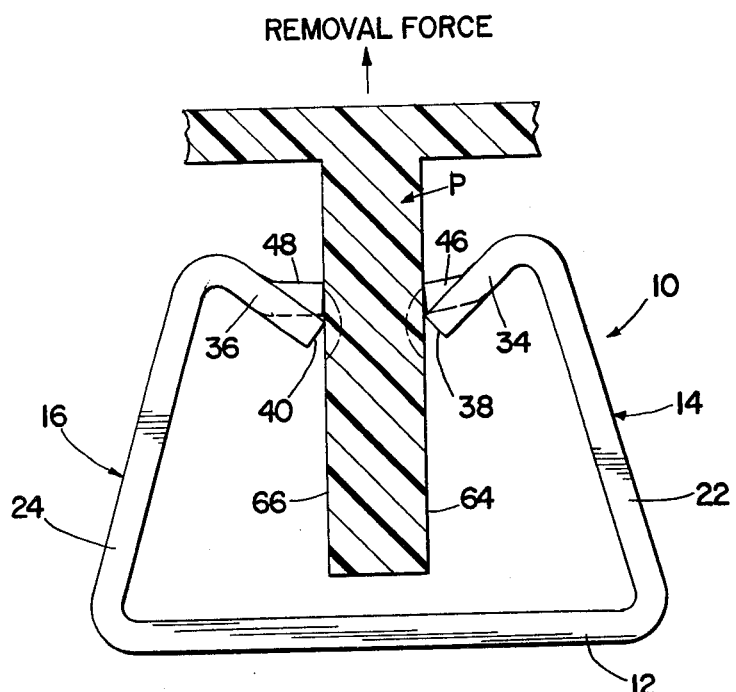
FIG. 5 is a view similar to FIG. 4 illustrating the removal of a retained plastic panel from the fastener of the present invention.

The operation of fastener 10 to releasably retain the edge of a plastic panel P may be seen in greater detail by reference to FIGS. 4 and 5. To retain the plastic panel P to the fastener 10 of the present invention, which may in turn be mounted on a support member, the edge of plastic panel P having an effective thickness 44 and defined by two generally parallel side surfaces 64 and 66 and an end surface 68 is inserted into the space between the free edges, 38 and 40, of the second leg portions, 34 and 36, respectively, of fastener 10 in such a manner as the side surfaces 64 and 66 are generally perpendicular to the base section 12 of fastener 10. The innermost edges of tabs 46 and 48 will resiliently engage the surfaces 64 and 66, respectively, and will tend to cause cold formed depressions therein generally equal to the distance 62 that the tab members 46 and 48 extend inwardly beyond the free edges 38 and 40 of the second leg portions. As the free edges, 38 and 40, come into engagement with the side surfaces, 64 and 66, the total length thereof, and the rather minimal resilient inwardly directed force thereon, will tend to eliminate or minimize the tendency of the free edges to cause cold formed depressions in the side surfaces 64 and 66 of the panel. It may thus be seen, that the depth of cold formed depressions formed in side surfaces 64 and 66 of panel P will be dependant on the distance 62 that the innermost edges of tabs, 46 and 48, extend inwardly beyond free edges, 38 and 40, respectively, of the second leg portions 34 and 36 respectively.

When removal of plastic panel P from fastener 10 is required, a relative removal force generally parallel to side surfaces 64 and 66 of the panel P is applied to the panel. The removal force must be initially sufficient to cause the leg portions 14 and 16 to be resiliently deformed to allow tabs 46 and 48 to be rotated out of the cold formed depressions formed thereby by the action of the second leg portions 34 and 36 pivoting about the free ends 38 and 40 thereof (see FIG. 5). When the second leg portions 34 and 36 have pivoted sufficiently to allow the tab portions 46 and 48 to rotate out of the cold formed depressions, the panel P may be removed from fastener 10 by the application of a lesser removal force sufficient to overcome the resilient frictional resistance of the free ends 38 and 40 on the side surfaces, 64 and 66, respectively, of panel P. It may thus be seen, that the initial removal force required to release retained panel P from fastener 10 is dependant upon the degree of deformation required to pivot the tabs 46 and 48 out of the cold formed depressions formed thereby which is in turn dependant upon the extension 62 of the innermost ends of tabs 46 and 48 beyond the free ends 38 and 40 of the respective leg portions.

Figure 6:
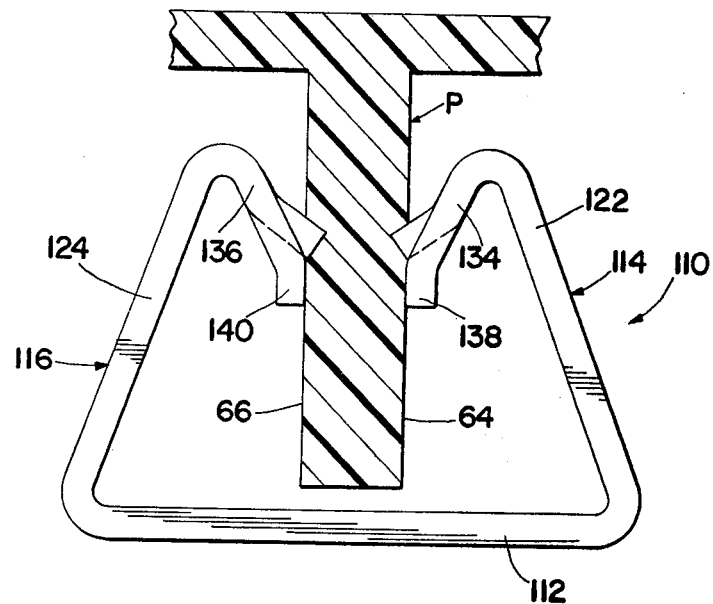
FIG. 6 is a view similar to FIG. 4 showing an alternate embodiment of the present invention.

An alternate embodiment of the present invention may be seen by reference to FIG. 6. Briefly, fastener 110 of the alternate embodiment is substantially identical to the fastener 10 illustrated in FIGS. 1 through 5 with the exception of the structure described in detail below. Fastener 110 comprises a base section 112 a pair of leg sections 114 and 116 each comprising a first leg portion, 122 and 124, respectively, and a second leg portions, 134 and 136, respectively. The free ends 138 and 140 of the second leg portions, 134 and 136, respectively, differ from the earlier described embodiment of FIG. 10, in that the free ends 138 and 140 are bent downwardly and/or outwardly so that the free edges 138 and 140 will not engage side surfaces 64 and 66 of panel P and will provide greater resistance to the free edges 138 and 140 causing cold formed depressions to be formed in said sides.

While the specific embodiments of the present invention have been set forth herein for illustrative purposes, it is understood that the present disclosure of the preferred forms has been made only by way of example and that numerous changes in the details of construction and combination and arrangement of parts may be resorted to without departing from the spirit and the scope of the invention has hereinafter claimed.

I claim:

1. A one-piece, spring steel fastener for releasably retaining the edge of a plastic panel defined by a pair of generally parallel side walls and having a known thickness, said fastener retaining said panels with a predetermined resistance to removal, said fastener comprising a generally flat base section defined in part by two generally parallel first edges and a pair of substantially identical leg sections, one of said leg sections cantilevered from each first edge, each of said leg sections comprising a generally flat first leg portion extending generally upwardly one of from said first edges to a second edge, said second edges generally parallel to said first edges, and generally flat second leg portion extending inwardly and downwardly from said second edge to a third edge, said third edges generally parallel to said second edges, at least one tab sheared from each second leg portion and extending inwardly therefrom, said tabs terminating at an innermost generally straight edge generally parallel to said third edges, said third edges having a total length greater than the total length of said innermost edges of said tabs, said third edges separated by a distance generally equal to the thickness of said panel whereby they will engage said side walls with no more than a slight compressive force and said innermost edges separated by a distance less than the thickness of the panel whereby they will engage the side walls with a greater compressive force than the third edges.

2. The fastener of claim 1 wherein said first leg portions extend upwardly and inwardly from said first edges to said second edges.

3. The fastener of claim 1 or 2 wherein each of said leg sections additionally comprises a third leg portion extending generally downwardly from said third edge to a fourth edge.

4. The fastener of claim 1 or 2 said third edges are free edges.

* * * * *